US010014953B2

(12) United States Patent
Ogawa (10) Patent No.: US 10,014,953 B2
(45) Date of Patent: Jul. 3, 2018

(54) OPTICAL RECEIVER CIRCUIT AND ADJUSTMENT METHOD FOR SAME

(71) Applicant: FUJIKURA LTD., Tokyo (JP)

(72) Inventor: Kensuke Ogawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/384,467

(22) Filed: Dec. 20, 2016

(65) Prior Publication Data

US 2017/0099110 A1    Apr. 6, 2017

Related U.S. Application Data

(63) Continuation of application No. PCT/JP2015/065930, filed on Jun. 2, 2015.

(30) Foreign Application Priority Data

Jun. 23, 2014  (JP) ................................. 2014-128249

(51) Int. Cl.
*H04B 10/60* (2013.01)
*H04B 10/61* (2013.01)
(Continued)

(52) U.S. Cl.
CPC .......... *H04B 10/613* (2013.01); *G02B 6/125* (2013.01); *G02B 6/126* (2013.01); *G02B 6/2766* (2013.01);
(Continued)

(58) Field of Classification Search
CPC ...... H04B 10/613; H04B 10/64; G02B 6/125; G02B 6/126; G02B 6/2773; G02B 6/2766;
(Continued)

(56) References Cited

U.S. PATENT DOCUMENTS 5,060,312 A * 10/1991 Delavaux ........... H04B 10/2572
398/204
6,922,510 B2 * 7/2005 Hatanaka ........... G02B 6/12004
385/37
(Continued)

FOREIGN PATENT DOCUMENTS

EP    3 009 869 A1    4/2016
JP    03-071119 A    3/1991
(Continued)

OTHER PUBLICATIONS

T. Hashimoto et al., "Dual polarization optical hybrid module using planar lightwave circuit", IEICE, 2009, pp. 194, Society Conference, C-3-39.
(Continued)

Primary Examiner — Ken N Vanderpuye
Assistant Examiner — Dibson Sanchez
(74) Attorney, Agent, or Firm — Sughrue Mion, PLLC (57) ABSTRACT

An optical receiver circuit includes: a substrate; and an optical waveguide device that is formed on the substrate. The optical waveguide device includes: a first optical splitter section branching the signal light into a first signal light propagation waveguide and a second signal light propagation waveguide and; a second optical splitter section branching the local-oscillator light into a first local-oscillator light propagation waveguide and a second local-oscillator light propagation waveguide; a first optical coupler section that combines the signal light propagating through the first signal light propagation waveguide and the local-oscillator light propagating through the first local-oscillator light propagation waveguide with each other; a second optical coupler section that combines the signal light propagating through the second signal light propagation waveguide and the
(Continued)

local-oscillator light propagating through the second local-oscillator light propagation waveguide with each other.

14 Claims, 6 Drawing Sheets

(51) Int. Cl.
| | |
|---|---|
| *G02B 6/125* | (2006.01) |
| *G02B 6/126* | (2006.01) |
| *G02B 6/27* | (2006.01) |
| *H04L 5/00* | (2006.01) |
| *H04J 14/06* | (2006.01) |
| *H04B 10/64* | (2013.01) |
| *G02B 6/12* | (2006.01) |

(52) U.S. Cl.
CPC ........... *G02B 6/2773* (2013.01); *H04B 10/64* (2013.01); *H04J 14/06* (2013.01); *H04L 5/0048* (2013.01); *G02B 2006/1215* (2013.01); *G02B 2006/12147* (2013.01)

(58) Field of Classification Search
CPC .. G02B 2006/1215; G02B 2006/12147; H04L 5/0048; H04J 14/06
USPC .................................................. 398/202–214
See application file for complete search history.

(56) References Cited

U.S. PATENT DOCUMENTS

| | | | |
|---|---|---|---|
| 7,724,991 B1* | 5/2010 | Doerr ................ | G02B 6/12004 385/14 |
| 8,526,102 B2* | 9/2013 | Inoue .................... | H04B 10/60 359/325 |
| 2005/0196176 A1* | 9/2005 | Sun .................... | H04B 10/2572 398/152 |
| 2010/0008679 A1* | 1/2010 | Cole .................... | H04B 10/40 398/185 |
| 2010/0046064 A1* | 2/2010 | Hasegawa .......... | G02B 6/12007 359/325 |
| 2010/0054761 A1* | 3/2010 | Chen ..................... | H04B 10/60 398/212 |
| 2010/0098411 A1* | 4/2010 | Nakashima .......... | H04B 10/60 398/25 |
| 2010/0119189 A1* | 5/2010 | Nasu .................. | G02B 6/12007 385/1 |
| 2010/0178065 A1* | 7/2010 | Nishihara ............ | H04B 10/61 398/202 |
| 2010/0196008 A1* | 8/2010 | Szafraniec .......... | H04B 10/2569 398/65 |
| 2010/0247113 A1* | 9/2010 | Kaneda ................ | H04B 10/60 398/208 |
| 2010/0260504 A1* | 10/2010 | Takahara ........... | H04B 10/5053 398/152 |
| 2010/0303476 A1* | 12/2010 | Barton ................ | H04B 10/505 398/212 |
| 2010/0329697 A1* | 12/2010 | Koizumi .................. | H03J 7/26 398/208 |
| 2011/0019961 A1* | 1/2011 | Yamazaki ............ | H04B 10/677 385/31 |
| 2011/0064422 A1* | 3/2011 | Kim .................. | G02B 6/12004 398/214 |
| 2011/0142457 A1* | 6/2011 | Betty ...................... | G02B 6/30 398/214 |
| 2011/0229075 A1* | 9/2011 | Watanabe ............. | G02B 6/125 385/31 |
| 2012/0014691 A1* | 1/2012 | Nebendahl ............ | H04B 10/60 398/25 |
| 2012/0106984 A1* | 5/2012 | Jones .................... | H04B 10/60 398/214 |
| 2012/0162746 A1* | 6/2012 | Kawashima ......... | G02B 6/2861 359/325 |
| 2012/0207474 A1* | 8/2012 | Inoue .................... | H04B 10/60 398/65 |
| 2012/0224812 A1* | 9/2012 | Inoue .................... | G02B 6/125 385/42 |
| 2013/0051809 A1* | 2/2013 | Mehrvar .............. | H04B 10/032 398/208 |
| 2013/0156361 A1* | 6/2013 | Kojima .................... | G02B 6/14 385/11 |
| 2013/0236136 A1 | 9/2013 | Nara et al. | |
| 2013/0330038 A1* | 12/2013 | Onishi .................. | G02B 6/262 385/31 |
| 2014/0086595 A1* | 3/2014 | Yamazaki .............. | G02B 6/125 398/214 |
| 2014/0286651 A1* | 9/2014 | Takechi ............... | H04B 10/614 398/208 |
| 2014/0376929 A1* | 12/2014 | Takechi ............... | H04B 10/614 398/212 |
| 2015/0016768 A1* | 1/2015 | Yamazaki ............ | H04B 10/556 385/11 |
| 2015/0139667 A1* | 5/2015 | Takeuchi .............. | G02F 1/0147 398/214 |
| 2015/0378098 A1* | 12/2015 | Matsumoto .......... | G02B 6/1228 356/477 |
| 2016/0119064 A1* | 4/2016 | Yamaji .................. | H04B 10/67 398/214 |
| 2016/0164599 A1* | 6/2016 | Heismann ........ | H04B 10/07953 398/26 |
| 2016/0178841 A1 | 6/2016 | Oka et al. | |
| 2017/0237504 A1* | 8/2017 | Takechi ............. | H04B 10/6151 398/212 |

FOREIGN PATENT DOCUMENTS

| | | |
|---|---|---|
| JP | 2012-518202 A | 8/2012 |
| JP | 5966021 B | 8/2016 |
| WO | 2010/095018 A2 | 8/2010 |
| WO | 2012/132907 A1 | 10/2012 |

OTHER PUBLICATIONS

Isa Kiyat et al., "A Compact Silicon-on-Insulator Polarization Splitter", IEEE Photonics Technology Letters, Jan. 2005, pp. 100-102, vol. 17, No. 1.
Kei Watanabe et al., "Ultralow Power Consumption Silica-Based PLC-VOA/Switches", Journal of Lightwave Technology, Jul. 2008, pp. 2235-2244, vol. 26, No. 14.
M. Bachmann et al., "Overlapping-image multimode interference couplers with a reduced number of self-images for uniform and nonuniform power splitting", Applied Optics, Oct. 1995, pp. 6898-6910, vol. 34, No. 30.
Tsung-Yang Liow et al., "Silicon Modulators and Germanium Photodetectors on SOI: Monolithic Integration, Compatibility, and Performance Optimization", IEEE Journal of Selected Topics in Quantum Electronics, Jan./Feb. 2010, pp. 307-315, vol. 16, No. 1.
Po-Dong et al., "Monolithic Silicon Photonic Integrated Circuits for Compact 100+Gb/s Coherent Optical Receivers and Transmitters", IEEE Journal of Selected Topics in Quantum Electronics, Jul./Aug. 2014, pp. 6100108-1-6100108-8, vol. 20, No. 4.

* cited by examiner

OPTICAL RECEIVER CIRCUIT AND ADJUSTMENT METHOD FOR SAME

CROSS REFERENCE TO RELATED APPLICATIONS

This application is a continuation application based on a PCT Patent Application No. PCT/JP2015/065930, filed Jun. 2, 2015, whose priority is claimed on Japanese Patent Application No. 2014-128249, filed on Jun. 23, 2014, the entire content of which are hereby incorporated by reference.

BACKGROUND OF THE INVENTION

Field of the Invention

The present invention relates to an optical receiver circuit enabling coherent detection in optical fiber communication in which high-capacity and high-speed data transmission is performed.

Description of the Related Art

In optical fiber communication, a technique enabling high-capacity and high-speed data transmission includes digital coherent communication. In the digital coherent communication, an optical receiver circuit for performing coherent detection is necessary. Toshikazu Hashimoto, Yohei Sakamaki, Hiroshi Yamazaki, Takayuki Mizuno, Takashi Goh, Yusuke Nasu, Kunisaku Hattori, Hiroshi Takahashi, "Dual polarization optical hybrid module using planar light wave circuit", 2009 Society Conference of Institute of Electronics, Information and Communication Engineers, C-3-39 (hereinafter, referred to as Non-Patent Document 1) discloses a 90-degree hybrid circuit configured to include an intersection portion in which a waveguide for propagating signal light and a waveguide for propagating local-oscillator light intersect each other on an input waveguide side. The 90-degree hybrid circuit detects a light signal in a quadrature phase-shift keying (QPSK) format which has orthogonal phase components, in coherent detection.

In the digital coherent communication, QPSK signals are multiplexed into orthogonal polarization states, and thus an optical circuit performing polarization splitting is necessary. Non-Patent Document 1 discloses an optical circuit, performing polarization splitting, which is integrated on the same substrate as two 90-degree hybrid circuits to which two polarization states orthogonal to each other are respectively input.

There is a problem in that the quality of coherent detection can deteriorate due to the mixing of signal light and local-oscillator light in the intersection portion of the waveguide. Additionally, since polarization rotates in the intersection portion, a detection error can occur due to inter-polarization crosstalk, and the amplitude of a received signal in coherent detection can be reduced due to the generation of an incoherent component, which can result in a problem of deterioration in noise tolerance.

As described above, in the related art, it can be necessary to separate an optical hybrid circuit for detecting quadrature phase components into that for each phase component in order to perform high-quality coherent light detection by using a single-mode external local-oscillator light source having a narrow line width. In this case, a polarization splitting circuit is also configured as an optical circuit separated from the optical hybrid circuit, and thus it is difficult to reduce the size of an optical receiver circuit. As a result, it is difficult to reduce the dimension of a light transmission device and to reduce costs.

An object of the invention for solving such problems is to realize an optical receiver circuit which is integrated on the same substrate as an optical hybrid circuit (further, a polarization splitting circuit and an optical hybrid circuit) without using an intersection waveguide, and to provide a small-sized optical receiver circuit enabling high-quality coherent light detection.

SUMMARY

An optical receiver circuit according to a first aspect of the invention includes a substrate, and an optical waveguide device that is formed on the substrate. The optical waveguide device includes a first optical splitter section in which signal light propagates, the first optical splitter section branching the signal light into a first signal light propagation waveguide and a second signal light propagation waveguide and; a second optical splitter section in which local-oscillator light propagates, the second optical splitter section branching the local-oscillator light into a first local-oscillator light propagation waveguide and a second local-oscillator light propagation waveguide; a first optical coupler section that combines the signal light propagating through the first signal light propagation waveguide and the local-oscillator light propagating through the first local-oscillator light propagation waveguide with each other, and makes the signal light and the local-oscillator light interfere with each other; a second optical coupler section that combines the signal light propagating through the second signal light propagation waveguide and the local-oscillator light propagating through the second local-oscillator light propagation waveguide with each other, and makes the signal light and the local-oscillator light interfere with each other; at least one first optical receiver unit that receives output light from the first optical coupler section; at least one second optical receiver unit that receives output light from the second optical coupler section; and a phase adjustment unit that is arranged in at least one of the first local-oscillator light propagation waveguide and the second local-oscillator light propagation waveguide. The first optical splitter section and the second optical splitter section are disposed so that a propagation direction of the local-oscillator light in the second optical splitter section is set to be a direction opposite to a propagation direction of the signal light in the first optical splitter section, the first optical coupler section and the second optical coupler section are disposed so that a propagation direction of the output light in the second optical coupler section is set to be a direction which is the same as a propagation direction of the output light in the first optical coupler section, and all waveguides for propagating at least one of the signal light and the local-oscillator light in the optical waveguide device are arranged so as not to overlap with each other with respect to the substrate when seen in a plan view.

The first local-oscillator light propagation waveguide may pass through a lateral side of the first optical coupler section and may then be connected to the first optical coupler section through a 180-degree bent portion, and the second local-oscillator light propagation waveguide may pass through a lateral side of the second optical coupler section and may then be connected to the second optical coupler section through a 180-degree bent portion.

The second optical splitter section may be arranged on a side opposite to the first optical coupler section and the second optical coupler section with respect to the first optical receiver unit and the second optical receiver unit.

The optical receiver circuit may further include an electrode that is provided on the optical waveguide device and propagates an electric signal which is output from each of the first optical receiver unit and the second optical receiver unit.

A portion of the waveguide included in the optical waveguide device and the first and second optical splitter sections may pass below the electrode.

The optical waveguide device may include a polarization splitting circuit at a front stage of the first optical splitter section.

The polarization splitting circuit may include a polarization splitting unit that is configured to split basic-order TE polarization and TM polarization from incident polarization multiplexed light, and a polarization rotation unit that is configured to rotate the TM polarization to the TE polarization.

The polarization splitting circuit may include a polarization rotation unit that is configured to convert basic-order TM polarization into high-order TE polarization in incident polarization multiplexed light, and a polarization splitting unit that is configured to split basic-order TE polarization and high-order TE polarization from each other.

The optical waveguide device may include two sets of processing units each of which is constituted by the first optical splitter section, the second optical splitter section, the first optical coupler section, the second optical coupler section, the first optical receiver unit, the second optical receiver unit, and the phase adjustment unit, a first connection waveguide, connected to the first optical splitter section, which is configured to propagate two polarizations split by the polarization splitting circuit to the different processing units, a second connection waveguide, connected to the second optical splitter section, which is configured to propagate the local-oscillator light to the different processing units, a signal light input waveguide that is configured to propagate the signal light from a location where the signal light is incident on the optical waveguide device to the polarization splitting circuit, a local-oscillator light input waveguide that is configured to propagate the local-oscillator light from a location where the local-oscillator light is incident on the optical waveguide device, and an optical splitter section that branches the local-oscillator light propagating through the local-oscillator light input waveguide into two second connection waveguides.

The optical waveguide device may include a core formed of silicon and a clad formed of silica.

A waveguide for propagating the local-oscillator light may include a 90-degree bent portion at one or two locations between a location where the local-oscillator light is incident on the optical waveguide device and a location where the waveguide is connected to a first optical splitter section.

The optical receiver circuit may further include an application unit that is configured to apply a frequency shift with respect to continuous incident light to the continuous local-oscillator light, and a detection unit that is configured to generate a heterodyne beat by making the incident light and the local-oscillator light, having the frequency shift applied thereto, interfere with each other, to thereby detect a phase of the heterodyne beat by setting either an output electric signal which is output from the first optical receiver unit or an output electric signal which is output from the second optical receiver unit as a reference signal and setting the other output electric signal different from the reference signal as an input signal, in which the optical receiver circuit may be configured to adjust a phase difference between the local-oscillator light incident on the first optical coupler section and the local-oscillator light incident on the second optical coupler section to $\pi/2$ by keeping the phase at $\pi/2$.

The optical receiver circuit may be connected to a control substrate, having a memory for recording a setting value of a current or a voltage to be applied to the phase adjustment unit at the time of adjusting a phase difference between the local-oscillator light incident on the first optical coupler section and the local-oscillator light incident on the second optical coupler section to $\pi/2$, mounted thereon.

In addition, a method of adjusting the optical receiver circuit according to a second aspect of the invention includes applying a frequency shift with respect to continuous incident light to the continuous local-oscillator light, generating a heterodyne beat by making the incident light and the local-oscillator light, having the frequency shift applied thereto, interfere with each other, detecting a phase of the heterodyne beat by setting either an output electric signal which is output from the first optical receiver unit or an output electric signal which is output from the second optical receiver unit as a reference signal and setting the other output electric signal different from the reference signal as an input signal, and adjusting a phase difference between the local-oscillator light incident on the first optical coupler section and the local-oscillator light incident on the second optical coupler section to $\pi/2$ by keeping the phase at $\pi/2$.

A setting value of a current or a voltage to be applied to the phase adjustment unit at the time of adjusting a phase difference between the local-oscillator light incident on the first optical coupler section and the local-oscillator light incident on the second optical coupler section to $\pi/2$ may be recorded in a memory.

According to the optical receiver circuit according to the above-described aspects of the invention, it is possible to enable high-quality coherent light detection by integrating optical hybrid circuits on the same substrate without using an intersection waveguide. Furthermore, it is possible to integrate a polarization splitting circuit and an optical hybrid circuit on the same substrate.

DETAILED DESCRIPTION OF THE PREFERRED EMBODIMENTS

Hereinafter, the invention will be described with reference to a preferred embodiment.

In an optical receiver circuit, each of a waveguide for propagating signal light and a waveguide for propagating local-oscillator light are branched into a plurality of waveguides from one input waveguide. In order to configure the waveguide, branched in such a manner, which does not include an intersection portion, it is necessary to make the waveguide for propagating signal light and the waveguide for propagating local-oscillator light pass through opposite sides across an optical receiver unit. In order to suppress a loss and a deterioration in waveform when an electric signal which is output from the optical receiver unit is extracted, it is preferable that an electrode (for example, an electrode pad for wire bonding) for extracting an output to the outside from a chip is provided adjacent to a chip end. The optical receiver unit and the electrode pad are connected to each other through a metal electrode. Therefore, the waveguide can pass under the metal electrode. The optical receiver circuit of the present embodiment is constituted by an optical waveguide device formed on a substrate. It is preferable that a waveguide used for the optical waveguide device is a silicon waveguide in which a core of the waveguide is formed of silicon (Si) and a clad of the waveguide is formed of silica ($SiO_2$). The silicon waveguide is a high refractive index difference waveguide. In the high refractive index difference waveguide, propagation light is strongly trapped in a core. For this reason, when a distance (depth) from the metal electrode to the core is equal to or greater than 1 μm, the influence of the metal electrode is negligible (can be suppressed to a practicable degree), and the absorption of propagation light due to conduction electrons in the metal electrode is negligible.

A planar optical waveguide device can be manufactured with high productivity by forming a light waveguide on a wafer and then cutting out a large number of chips from the wafer. It is preferable to separate a core of the waveguide from a chip end by a distance of 50 μm or greater in order to avoid an impact during the cut-out of the chip from the wafer, the influence of distortion from the chip end, and the like. In addition, there is a process of melting solder in order to bond a wire to a metal pad during wire bonding. At this time, it is preferable that the core of the waveguide is disposed so as not to be located immediately under an electrode pad for wire bonding in order to avoid the damage of the waveguide due to an impact of ultrasonic waves or heat.

In a silicon waveguide in which the height of a core is approximately 200 nm, light of transverse electric field (TE) polarization in a linearly polarization state where an electric field is parallel to a substrate surface is stably propagated. The loss of transverse magnetic field (TM) polarization in a linearly polarization state where a magnetic field is parallel to a substrate surface tends to become larger than that of TE polarization. Accordingly, an example of a configuration of an optical circuit for polarization splitting (polarization splitting circuit) is a configuration in which a polarization rotation waveguide (polarization rotation unit) is connected to a waveguide for propagating light of TM polarization, among two waveguides located at the back of a waveguide splitting section (polarization splitting unit) for polarization splitting, and the TM polarization is rotated to TE polarization. Such a polarization splitting circuit includes a polarization splitting unit that splits TE polarization and TM polarization from each other and propagates the split polarizations to two waveguides, and a polarization rotation unit that rotates the split TM polarization to the TE polarization. Both two signal lights which are output from the polarization splitting circuit are set to be in a TE polarization state by polarization rotation. For this reason, both two 90-degree hybrid circuits after splitting can be designed so as to function with respect to TE polarization. Thereby, a common configuration can be applied to the 90-degree hybrid circuits, and thus the design is simplified as compared to the related art (case where processing is performed in a state of TM polarization).

In order to have the optical receiver circuit built-in a compact and pluggable optical transceiver, it is preferable that a light input end for inputting signal light and local-oscillator light to an optical receiver circuit and an output pad for extracting an electric signal from the optical receiver circuit are disposed on the opposite side of each chip. In order to reduce the skew of an output electric signal between different polarizations, it is preferable that a waveguide is disposed so as to solve a propagation time difference in a light signal and an electric signal between different polarizations. In a case where polarization rotation is performed as described above, characteristics of only TE polarization participate in the light signal after the different polarizations are split from each other. For this reason, the propagation time difference depends on only the arrangement of the waveguide, and thus it is possible to easily estimate the propagation time difference.

In a case where light which is input to an optical receiver circuit is propagated by an optical fiber, a package of the optical fiber is required to have such a height as to accommodate a connection portion for connecting an optical receiver circuit chip and the optical fiber. In order to reduce the height of the package, it is preferable to install the optical fiber so as to input light (each of signal light and local-oscillator light) in parallel from an end face of the optical receiver circuit chip to a substrate surface. In order to provide a light input end and an output pad of an electric signal on a side opposite to the optical receiver circuit chip, it is preferable that an light input end for inputting signal light and an light input end for inputting local-oscillator light are disposed on the same end face of the chip.

In an optical receiver circuit of this embodiment, an optical hybrid circuit includes at least the following elements.

(1) A first optical splitter section that branches signal light into a first signal light propagation waveguide and a second signal light propagation waveguide and propagates the branched signal light.

(2) A second optical splitter section that branches local-oscillator light into a first local-oscillator light propagation waveguide and a second local-oscillator light propagation waveguide and propagates the branched local-oscillator light.

(3) A first optical coupler section that combines the signal light propagating through the first signal light propagation waveguide and the local-oscillator light propagating through the first local-oscillator light propagation waveguide with each other to make the signal light and the local-oscillator light interfere with each other.

(4) A second optical coupler section that combines the signal light propagating through the second signal light propagation waveguide and the local-oscillator light propagating through the second local-oscillator light propagation waveguide with each other to make the signal light and the local-oscillator light interfere with each other.

(5) A phase adjustment unit that is arranged in at least one of the first local-oscillator light propagation waveguide and the second local-oscillator light propagation waveguide.

According to the optical hybrid circuit, it is possible to give a predetermined phase difference (for example, 90 degrees=π/2 radian) to local-oscillator light which is branched into two local-oscillator light propagation waveguides in the phase adjustment unit and is propagated. Further, it is possible to output interference light by making signal light and local-oscillator light interfere with each other by an optical multiplexer. Each of the optical coupler sections generally outputs two interference lights as differential signals.

An optical receiver unit is provided in order to receive interference light which is output from the optical coupler section. The optical receiver unit is, for example, a light receiver, a photoelectric conversion element, or the like. The optical receiver unit converts a light signal into an electric signal and outputs the converted light signal. An electrode propagating the electric signal which is output from the optical receiver unit can be provided on an optical waveguide device. For this reason, a portion of a waveguide included in the optical waveguide device and the optical splitter section can pass under the electrode propagating the electric signal.

In the optical waveguide device, it is preferable that the following requirements are satisfied in order to configure a waveguide that does not include an intersection portion.

(A) A first optical splitter section and a second optical splitter section are disposed so that a propagation direction local-oscillator light in the second optical splitter section is set to be opposite to a propagation direction of signal light in the first optical splitter section.

(B) A first optical coupler section and a second optical coupler section are disposed so that a propagation direction of output light in the second optical coupler section is set to be the same as a propagation direction of output light in the first optical coupler section.

A direction in which two signal light propagation waveguides branch from the first optical splitter section and a direction in which two local-oscillator light propagation waveguides branch from the second optical splitter section are set to be opposite to each other by satisfying the requirement (A). Then, it is possible to dispose a local-oscillator light propagation waveguide in a region where the two signal light propagation waveguides are separated from each other. Therefore, it is possible to bring a launch end of the local-oscillator light propagation waveguide close to a launch end of the signal light propagation waveguide without making the waveguides intersect each other.

It is possible to make the signal light propagation waveguide and the local-oscillator light propagation waveguide incident on an optical multiplexer from input ends located on the same side by satisfying the requirement (B). In addition, it is possible to provide a launch end on a side opposite to an input end and to connect an optical receiver unit to the launch end in the optical multiplexer. Therefore, it is possible to generate interference light by using, for example, an optical interferometer of 2×2 branching.

Waveguides that do not have an intersection portion are at least the first signal light propagation waveguide, the second signal light propagation waveguide, the first local-oscillator light propagation waveguide, and the second local-oscillator light propagation waveguide. It is preferable that all of the waveguides, including the above-mentioned waveguides, for propagating at least one of signal light and local-oscillator light in the optical waveguide device are disposed so as not to overlap each other with respect to a substrate when seen in a plan view.

In order to dispose the signal light propagation waveguide and the local-oscillator light propagation waveguide so as to satisfy the requirements (A) and (B), a configuration in which the local-oscillator light propagation waveguide is bent at approximately 180 degrees so that a propagation direction matches the signal light propagation waveguide, a configuration in which the signal light propagation waveguide is bent at approximately 180 degrees so that a propagation direction matches the local-oscillator light propagation waveguide, a configuration in which each of the signal light propagation waveguide and the local-oscillator light propagation waveguide is bent at approximately 90 degrees or at any other degrees, and the like are adopted. In order to suppress the loss of signal light, it is preferable to reduce a change in a propagation direction of signal light as much as possible and to greatly change a propagation direction of local-oscillator light. For example, a structure is adopted in which the local-oscillator light propagation waveguide passes through the back side of the optical coupler section and is then connected to the optical coupler section through a bent portion which is bent at 180 degrees.

It is preferable that an optical splitter section (second optical splitter section) through which local-oscillator light propagates is provided on a side opposite to each of the optical coupler sections with respect to each of the optical receiver units. That is, it is preferable that the optical receiver unit is disposed between each of the optical coupler sections and the second optical splitter section in a direction along a propagation direction of light with respect to an input end of the optical coupler section. Thereby, the second optical splitter section is disposed so as to be short so that a distance between the second optical splitter section and the optical coupler section becomes shorter than the length of a connection waveguide connecting the launch end of the optical coupler section and the optical receiver unit to each other. Even when one optical coupler section is disposed between two local-oscillator light propagation waveguides, it is possible to easily dispose an optical receiver unit connected to the optical coupler section on the inner side surrounding the optical coupler section and the local-oscillator light propagation waveguides. For example, in FIG. 1 (details will be described later), optical receiver units 110 and 111 are disposed between an optical splitter section 121 and an optical coupler section 109. Two connection waveguides 141 and 142 extending from the optical splitter section 121 are disposed taking a roundabout way to avoid the regions of the optical coupler section 109 and the optical receiver units 110 and 111.

In a case where a signal is multiplexed to two polarization components of signal light, a processing unit (for example, reference numerals 150 and 151 of FIG. 1) which is configured to include the optical hybrid circuit and the optical receiver unit which are described above is provided with respect to each of the polarization components. The processing unit includes a first optical splitter section, a second optical splitter section, a first optical coupler section, a second optical coupler section, a first optical receiver unit, a second optical receiver unit, and a phase adjustment unit. The two polarization components included in the signal light are split from each other by a polarization splitting circuit before being incident on the respective optical hybrid circuits.

Hereinafter, examples of the invention will be described. Light waveguides in all of the examples of the invention are configured on the basis of a high refractive index difference waveguide in which crystalline silicon (Si) is configured as a core material, and silica ($SiO_2$) is configured as a clad material, except for a phase adjustment unit, an optical receiver unit, and a metal electrode portion.

However, the core material and the clad material are not limited thereto, and an optical phase modulator may be configured using a high refractive index difference waveguide constituted by a core and a clad which are formed of another semiconductor material or an insulating material.

A substrate of an optical waveguide device may be formed of crystalline silicon (Si). A substrate including a silicon waveguide can be formed on the basis of a silicon on insulator (SOI) substrate constituted by three layers of Si/SiO2/Si. It is possible to form a lower clad constituted by an intermediate $SiO_2$ layer and to form a core constituted by an upper Si layer.

Example 1

Figure 1:
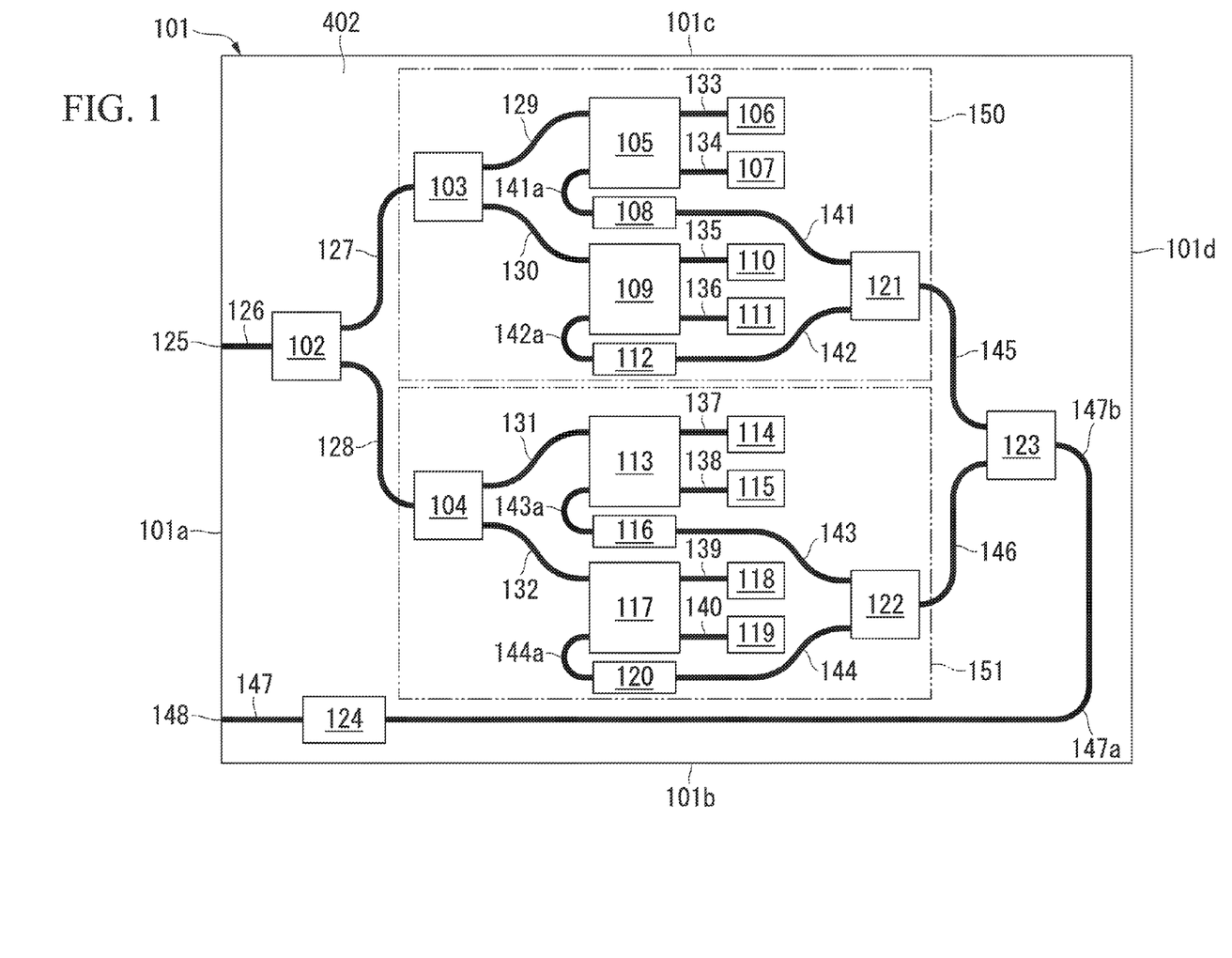
FIG. 1 is a schematic plan view showing a configuration of an optical waveguide device in an optical receiver circuit.

The optical receiver circuit 101 will be described with reference to FIGS. 1 to 5. FIG. 1 shows a schematic configuration on a single horizontal plane of a waveguide constituting the optical receiver circuit 101.

Signal light is incident from one end (input end) of an input waveguide 126, as incident light. The other end (launch end) of the input waveguide 126 is connected to an input end of a polarization splitting circuit 102. The polarization splitting circuit 102 has two launch ends. One side ends of respective connection waveguides 127 and 128 are connected to the launch ends, respectively.

Figure 2A:
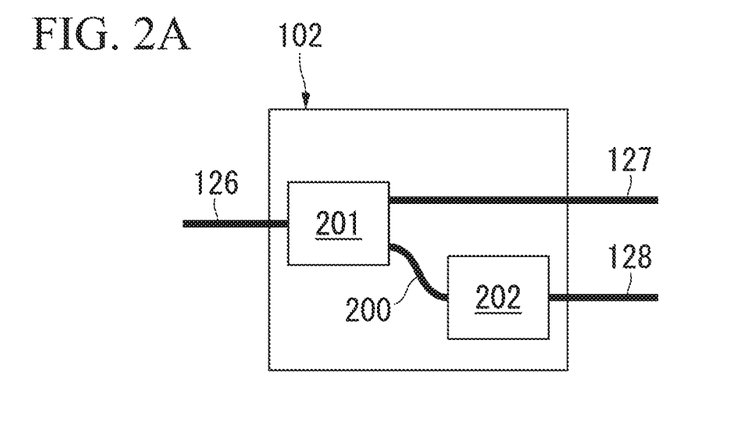
FIG. 2A is a schematic configuration diagram showing a polarization splitting circuit.
Figure 2B:
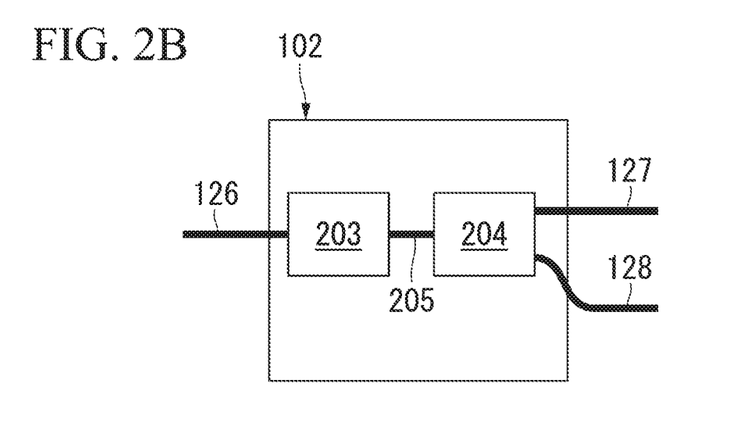
FIG. 2B is a schematic configuration diagram showing a polarization splitting circuit.

The polarization splitting circuit 102 is configured in two ways as shown in FIGS. 2A and 2B.

In the configuration of FIG. 2A, the polarization splitting circuit 102 includes a polarization splitting section 201 and a polarization rotation unit 202. The input end of the polarization splitting circuit 102 is an input end of the polarization splitting unit 201. One side ends (input ends) of respective connection waveguides 127 and 200 are connected to two launch ends of the polarization splitting unit 201, respectively. The polarization rotation unit 202 is provided at the rear stage of the polarization splitting unit 201, and an input end of the polarization rotation unit 202 is connected to the other end (launch end) of the connection waveguide 200. One launch end of the polarization splitting circuit 102 is a launch end which is connected to the connection waveguide 127, out of the two launch ends of the polarization splitting unit 201. The other launch end of the polarization splitting circuit 102 is a launch end of the polarization rotation unit 202. Here, when the connection waveguide 200 connecting the polarization splitting unit 201 and the polarization rotation unit 202 to each other is considered to be a portion of the connection waveguide 128, it can also be understood that the polarization rotation unit 202 is inserted into the connection waveguide 128.

In the configuration of FIG. 2B, the polarization splitting circuit 102 includes a polarization rotation unit 203 and a polarization splitting unit 204. The polarization rotation unit 203 is inserted into the front stage of the polarization splitting unit 204. The input end of the polarization splitting circuit 102 is an input end of the polarization rotation unit 203. The launch end of the polarization rotation unit 203 is connected to one end (input end) of the connection waveguide 205, and the other end (launch end) of the connection waveguide 205 is connected to an input end of the polarization splitting unit 204. Here, when a connection waveguide 205 connecting the polarization rotation unit 203 and the polarization splitting unit 204 to each other is considered to be a portion of the input waveguide 126, it can be understood that the polarization rotation unit 203 is inserted into the input waveguide 126. One side ends (input ends) of the respective connection waveguides 127 and 128 are connected to two launch ends of the polarization splitting unit 204, respectively. Two launch ends of the polarization splitting circuit 102 are two launch ends of the polarization splitting unit 204.

Figure 3:
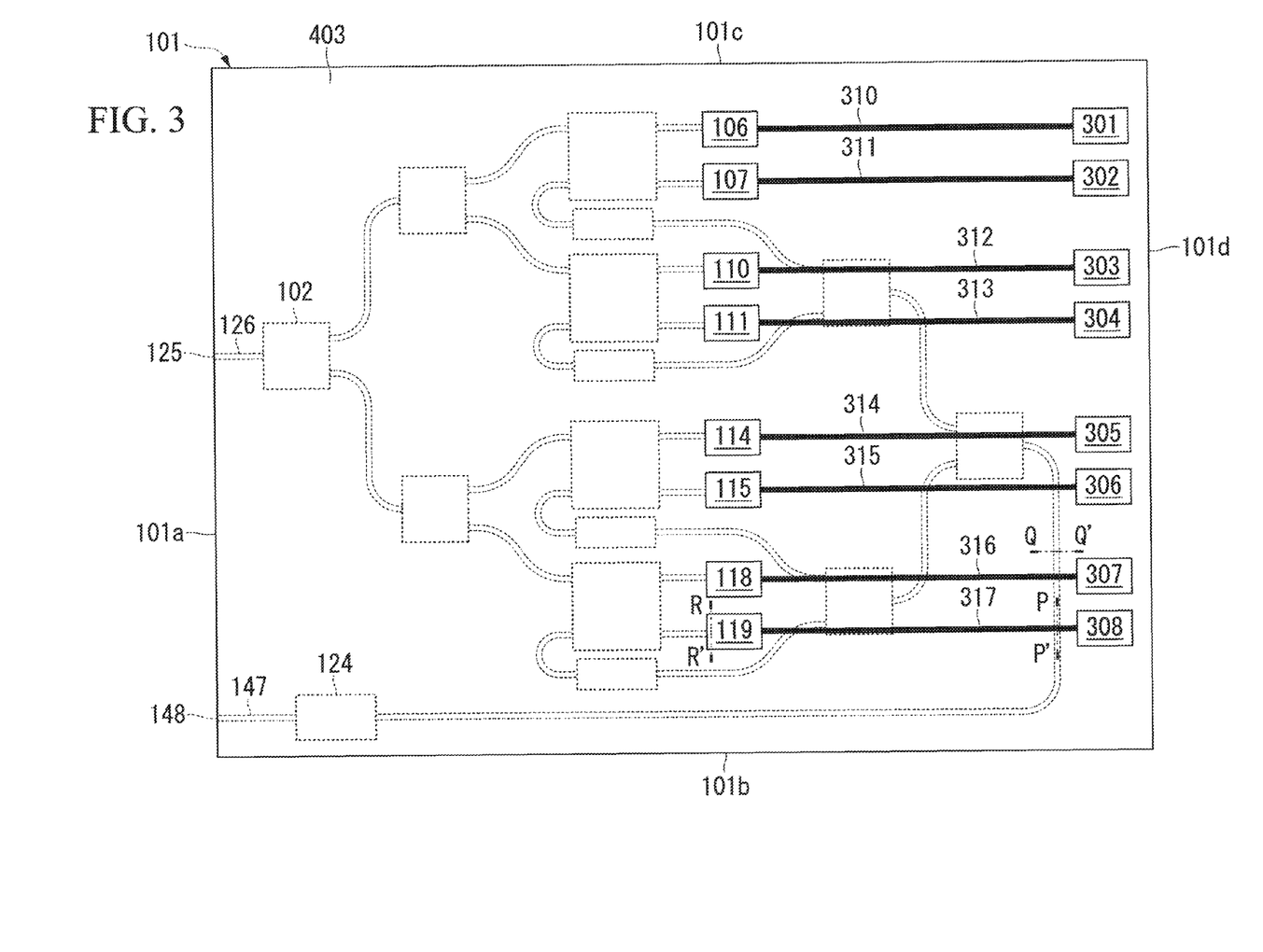
FIG. 3 is a schematic plan view showing configurations of high-frequency electrodes and bonding electrodes in the optical receiver circuit.

In each of the configurations of the polarization splitting circuits 102, a TE polarization component of incident light is launched from a launch end to which one end (input end) of the connection waveguide 127 is connected, as guided light of TE polarization. A TM polarization component of incident light is converted to a TE polarization component, and is launched from a launch end to which one end of the connection waveguide 128 is connected, as guided light of TE polarization. The TE polarization refers to a linearly polarization state where an electric field is parallel to an upper plane of a substrate (see reference numeral 401 of FIG. 4B), and the TM polarization refers to a linearly polarization state in which a magnetic field is parallel to the upper plane of the substrate. In the following description, a direction parallel to an upper plane of a substrate will be defined as a horizontal direction, and a direction orthogonal to the upper plane of the substrate will be defined as a vertical direction. A width is measured in the horizontal direction, and a height is measured in the vertical direction. In FIGS. 1 to 3, the paper is in the horizontal direction.

In the configuration of FIG. 2A, a directional coupler, constituted by a rib waveguide, which is disclosed in, for example, IEEE Photonics Technology Letters vol. 17, no. 1, pp. 100-102, 2005, can be used for the polarization splitting unit 201. An example of a dimension includes setting the width of a core top portion of the rib waveguide to 500 nm, setting a height from a core bottom surface to the core top portion to 220 nm, setting a gap between waveguides to 300 nm, and a coupling length of the directional coupler to 300 μm. An asymmetrical rib waveguide (for example, see Japanese Patent Application No. 2013-135492) can be used for the polarization rotation unit 202. Guided light of TM polarization which is incident on the input end of the polarization rotation unit 202 is converted into guided light of TE polarization by polarization rotating at 90 degrees, and is launched from the launch end of the polarization rotation unit 202.

In the configuration of FIG. 2B, it is possible to configure the polarization rotation unit 203 by using, for example, a rib waveguide through which high-order guided light propagates. In the rib waveguide through which high-order guided light propagates, a TM polarization component of incident light is converted into a high-order TE polarization component and is guided by asymmetry of a waveguide core section in the vertical direction. A TE polarization component of incident light is guided as a basic-order TE polarization component without being converted. Guided light of basic-order TE polarization and guided light of high-order TE polarization are split from each other when passing through the polarization splitting unit 204 using an asymmetrical rib waveguide directional coupler. Further, in a waveguide after splitting, high-order TE polarization can be propagated as basic-order TE polarization (see Japanese Patent Application No. 2013-135490).

According to the polarization splitting circuit 102 mentioned above, in a case where incident light propagating through an input waveguide includes a basic-order TE polarization component and a basic-order TM polarization component, it is possible to split the TE polarization component and the TM polarization component from each other. Further, it is possible to propagate the components to different connection waveguides 127 and 128 from two launch ends of the polarization splitting circuit 102, as guided light of basic-order TE polarization.

Next, a description of the optical receiver circuit will be continued by referring back to FIG. 1. Each of optical coupler sections 105, 109, 113, and 117 has two input ends and two launch ends. One input end is an input end for signal light, and the other input end is an input end for local-oscillator light. Connection waveguides 129 to 132 for propagating signal light are connected to one (for signal light) input end. Connection waveguides 141 to 144 for propagating local-oscillator light are connected to the other (for local-oscillator light) input end. Interference light generated by a combination of signal light and local-oscillator light in the optical coupler sections 105, 109, 113, and 117 is output from two launch ends.

The other end (launch end) of the connection waveguide 127 is connected to the input end of the optical splitter section 103. The optical splitter section 103 has two launch ends. One end of the connection waveguide 129 and one end of the connection waveguide 130 are connected to one launch end of the optical splitter section 103 and the other launch end of the optical splitter section 103, respectively. The other end of the connection waveguide 129 is connected to one (for signal light) input end of the optical coupler section 105. The other end of the connection waveguide 130 is connected to one (for signal light) input end of the optical coupler section 109.

The other end (launch end) of the connection waveguide 128 is connected to the input end of the optical splitter section 104. The optical splitter section 104 has two launch ends. One end of the connection waveguide 131 and one end of the connection waveguide 132 are connected to one launch end of the optical splitter section 104 and the other launch end of the optical splitter section 104, respectively. The other end of the connection waveguide 131 is connected to one (for signal light) input end of the optical coupler section 113. The other end of the connection waveguide 132 is connected to one (for signal light) input end of the optical coupler section 117.

Local-oscillator light of TE polarization is incident from one end (input end) of an input waveguide 147. The phase adjustment unit 124 is inserted into the input waveguide 147. A thermo-optical phase adjuster, using a rectangular waveguide, which is disclosed in, for example, Journal of Lightwave Technology vol. 26, no 14, pp. 2235-2244, 2008, can be used for the phase adjustment unit 124. The configuration of the phase adjustment unit 124 is not limited thereto, and a rib waveguide can also be used.

The other end (launch end) of the input waveguide 147 is connected to an input end of an optical splitter section 123 (a first arranged optical splitter section). One side ends (input ends) of respective connection waveguides 145 and 146 are connected to two launch ends of the optical splitter section 123, respectively.

The other end (launch end) of the connection waveguide 145 is connected to the input end of the optical splitter section 121. Two launch ends of the optical splitter section 121 are connected to one side ends of the respective connection waveguides 141 and 142, respectively. The other end of the connection waveguide 141 is connected to the other (for local-oscillator light) input end of the optical coupler section 105. A phase adjustment unit 108 is inserted into the connection waveguide 141. The other end of the connection waveguide 142 is connected to the other (for local-oscillator light) input end of the optical coupler section 109. A phase adjustment unit 112 is inserted into the connection waveguide 142.

The other end (launch end) of the connection waveguide 146 is connected to the input end of the optical splitter section 122. Two launch ends of the optical splitter section 122 are connected to one side ends of the respective connection waveguides 143 and 144, respectively. The other end of the connection waveguide 143 is connected to the other (for local-oscillator light) input end of the optical coupler section 113. A phase adjustment unit 116 is inserted into the connection waveguide 143. The other end of the connection waveguide 144 is connected to the other (for local-oscillator light) input end of the optical coupler section 117. The phase adjustment unit 120 is inserted into the connection waveguide 144.

The phase adjustment units 108, 112, 116, and 120 may have a configuration which is the same as or different from the phase adjustment unit 124. In addition, the phase adjustment units 108, 112, 116, and 120 may have the same configuration or may have different configurations.

An I component and a Q component of a coherent light detection signal are generated due to interference between local-oscillator light and each of a forward phase (I) component and a quadrature phase (Q) component of a TE polarization component of incident light. A phase difference between the I component and the Q component is kept at $\pi/2$ by adjusting a current or a voltage which is applied to the phase adjustment unit 108 or 112, and thus a crosstalk of a signal of the TE polarization component is removed.

The phase difference can be maintained by only driving either the phase adjustment unit 108 or 112, and thus either the phase adjustment unit 108 or 112 may be omitted. When both the phase adjustment units 108 and 112 are provided, the correspondence between the I component and the Q component of the coherent light detection signal can be reversed, which results in an increase in the degree of freedom of a system configuration. Whether to provide either one or both of the phase adjustment units 108 and 112 may be selected in accordance with specifications required for the optical receiver circuit 101. It is possible to further improve the accuracy of the phase difference by applying a voltage for fine adjustment to the phase adjustment unit 108 or 112.

Similarly, an I component and a Q component of a coherent light detection signal are generated due to interference between local-oscillator light and each of a forward phase (I) component and a quadrature phase (Q) component of a TM polarization component of incident light. A phase difference between the I component and the Q component is kept at $\pi/2$ by adjusting a current or a voltage which is applied to the phase adjustment unit 116 or 120, and thus a crosstalk of a signal of the TM polarization component is removed.

Similarly to the phase adjustment unit 108 or 112, either the phase adjustment unit 116 or 120 may be omitted.

It is possible to control a phase of local-oscillator light with respect to a phase of incident light by using the phase adjustment unit 124, independently of the control of a phase difference between an I component and a Q component of a coherent light detection signal of each polarization component. In a case where the configuration of the optical receiver circuit 101 is simplified, the phase adjustment unit 124 may be omitted.

One end of a connection waveguide 133 is connected to one launch end of the optical coupler section 105, and the other end of the connection waveguide 133 is connected to an input end of an optical receiver unit 106. One end of a connection waveguide 134 is connected to the other launch end of the optical coupler section 105, and an input end of an optical receiver unit 107 is connected to the other end of the connection waveguide 134. An electric signal TE/I+ having a positive polarity of the I component of the coherent light detection signal of the TE polarization component and an electric signal TE/I− having a negative polarity thereof are generated in the optical receiver units 106 and 107, respectively.

One end of a connection waveguide 135 is connected to one launch end of the optical coupler section 109, and the other end of the connection waveguide 135 is connected to an input end of the optical receiver unit 110. One end of a connection waveguide 136 is connected to the other launch end of the optical coupler section 109, and an input end of the optical receiver unit 111 is connected to the other end of the connection waveguide 136. An electric signal TE/Q+ having a positive polarity of the Q component of the coherent light detection signal of the TE polarization component and an electric signal TE/Q− having a negative polarity thereof are generated in the optical receiver units 110 and 111, respectively.

One end of a connection waveguide 137 is connected to one launch end of the optical coupler section 113, and the other end of the connection waveguide 137 is connected to an input end of an optical receiver unit 114. One end of a connection waveguide 138 is connected to the other launch end of the optical coupler section 113, and an input end of an optical receiver unit 115 is connected to the other end of the connection waveguide 138. An electric signal TM/I+ having a positive polarity of the I component of the coherent light detection signal of the TM polarization component and an electric signal TM/I− having a negative polarity thereof are generated in the optical receiver unit 114 and 115, respectively.

One end of a connection waveguide 139 is connected to one launch end of the optical coupler section 117, and an input end of an optical receiver unit 118 is connected to the other end of the connection waveguide 139. One end of a connection waveguide 140 is connected to the other launch end of the optical coupler section 117, and an input end of an optical receiver unit 119 is connected to the other end of the connection waveguide 140. An electric signal TM/Q+ having a positive polarity of the Q component of the coherent light detection signal of the TM polarization component and an electric signal TM/Q− having a negative polarity thereof are generated in the optical receiver unit 118 and 119, respectively.

In order to avoid waveguide intersection, local-oscillator light is guided from a direction opposite to a direction in which incident light propagates. Features of a path shown in FIG. 1 will be described with respect to some elements of a TE polarization component of incident light. A portion of elements of local-oscillator light is guided through the connection waveguide 141 from a direction opposite to a direction in which a portion of elements of a TE polarization component of incident light is incident on one input end of the optical coupler section 105 from the connection waveguide 129. The connection waveguide 141 includes a 180-degree bent portion 141a. A portion of elements of local-oscillator light propagating through the connection waveguide 141 reverses its propagation direction in the same direction as a portion of elements of incident light propagating through the connection waveguide 129, and is then incident on the optical coupler section 105 from the other input end of the optical coupler section 105.

Since the connection waveguide 141 is constituted by a high refractive index difference waveguide, it is possible to reduce the radius of curvature of the 180-degree bent portion 141a to approximately 5 μm without causing an increase in a bending loss. For this reason, it is possible to reduce a footprint of the optical receiver circuit 101. The length of the connection waveguide 141 in a waveguide direction is also reduced, and a propagation loss is also reduced, thereby allowing a light loss of the optical receiver circuit 101 to be reduced. It is also possible to configure a 180-degree bent portion by connecting two 90-degree bent portions to each other in series.

The connection waveguide 141 is provided between the side wall of the optical coupler section 105 and the side wall of the optical coupler section 109. In order to reduce a footprint of the optical receiver circuit 101, it is necessary to reduce an interval between the optical coupler section 105 and the optical coupler section 109 as much as possible. However, in order to avoid light leakage from the connection waveguide 141, it is preferable to secure an interval between one side wall of the connection waveguide 141 and one side wall of the optical coupler section 105 and an interval between the other side wall of the connection waveguide 141 and one side wall of the optical coupler section 109 by at least approximately 2 μm.

Paths of the other elements of the TE polarization component of the incident light and elements of a TM polarization component of incident light have the same features. For example, a portion of elements of local-oscillator light is guided through the connection waveguides 142, 143, and 144 from a direction opposite to a direction in which a portion of elements of incident light is incident on one input end of the optical coupler sections 109, 113, and 117 from the connection waveguides 130, 131, and 132. The connection waveguides 142, 143, and 144 have 180-degree bent portions 142a, 143a, and 144a, respectively. A portion of elements of local-oscillator light propagating through the connection waveguides 142, 143, and 144 reverses its propagation direction in the same direction as a portion of elements of incident light propagating through the connection waveguides 130, 131, and 132, and is then incident on the other input ends of the optical coupler sections 109, 113, and 117.

In FIG. 1, an input end 148 of the input waveguide 147 and an input end 125 of the input waveguide 126 are positioned on the same end face 101a of the optical receiver circuit 101. In order to avoid waveguide intersection, the input waveguide 147 has two 90-degree bent portions 147a and 147b. The input end 148 of the input waveguide 147 does not necessarily have to be present on the same end face as the input end 125 of the input waveguide 126. When the end face 101a of the optical receiver circuit 101 having the input end 125 of the input waveguide 126 thereon is set to be a front surface in the vertical direction, the input end of the input waveguide 147 may be positioned on any one of two end faces 101b and 101c in the vertical direction which are in contact with the front end face 101a in the vertical direction. In this case, the input waveguide 147 has one 90-degree bent portion. An end face for providing the input end of the input waveguide 147 may be selected in accordance with a configuration of a housing having the optical receiver circuit 101 built-in.

A propagation loss of local-oscillator light varying depending on a path causes a detection error in which the intensity of a coherent light detection signal varies between TE and TM polarization components or between I and Q components. It is preferable to set the length of each connection waveguide in a waveguide direction so that all propagation losses are equal to each other with respect to four paths of a path constituted by the connection waveguide 145 and the connection waveguide 141, a path constituted by the connection waveguide 145 and the connection waveguide 142, a path constituted by the connection waveguide 146 and the connection waveguide 143, and a path constituted by the connection waveguide 146 and the connection waveguide 144. For example, the connection waveguides 145 and 146 are set to have the same length, and the connection waveguides 141 to 144 are set to have the same length. For this reason, optical splitter sections 121 to 123 are provided in a region on a side opposite to the optical coupler sections 105, 109, 113, and 117, with respect to the optical receiver units 106, 107, 110, 111, 114, 115, 118, and 119, on the same plane as the horizontal plane on which the optical coupler sections 105, 109, 113, and 117 are positioned.

It is preferable to equalize propagation losses with respect to four paths of incident light for the same reason. For example, the connection waveguides 127 and 128 are set to have the same length, and the connection waveguides 129 to 132 are set to have the same length.

Next, a specific example of dimensions of respective units will be described, but the invention is not limited to the specific example. Cores of the connection waveguides 127 to 146 and the input waveguides 126 and 147 have a rectangular section having a width of 500 µm and a height of 220 nm within a plane orthogonal to a propagation direction of guided light. The optical splitter sections 103, 104, and 123 are 1×2 multi-mode interferometers each of which is constituted by a slab waveguide having a width of 1500 nm, a length along a waveguide direction of 1800 nm, and a height of 220 nm. An interval between the centers of two launch ends is 800 nm. The optical coupler sections 105, 109, 113, and 117 are 2×2 multi-mode interferometers each of which is constituted by a slab waveguide having a width of 1500 nm, a length along a waveguide direction of 3600 nm, and a height of 220 nm. An interval between the centers of two input ends and an interval between the centers of two launch ends are 800 nm. The 1×2 multi-mode interferometer and the 2×2 multi-mode interferometer are not limited to these dimensions, and can be designed in accordance with a description of for example, Applied Optics vol. 34, no. 30, pp. 6898-6910, 1995.

With a configuration schematically shown in FIG. 3, electric signals TE/I+, TE/I−, TE/Q+, TE/Q−, TM/I+, TM/I−, TM/Q+, and TM/Q− generated by the optical receiver units 106, 107, 110, 111, 114, 115, 118, and 119 are output from bonding electrodes 301 to 308 respectively connected to high-frequency signal electrodes 310 to 317 through the high-frequency signal electrodes 310 to 317 respectively connected to the optical receiver units 106, 107, 110, 111, 114, 115, 118, and 119. The high-frequency signal electrodes 310 to 317 and the bonding electrodes 301 to 308 are provided on the upper surface of the optical receiver circuit 101.

TE polarization components are individually listed as follows. The high-frequency signal electrode 310 and the bonding electrode 301 are used for the propagation of TE/I+ generated by the optical receiver unit 106.

The high-frequency signal electrode 311 and the bonding electrode 302 are used for the propagation of TE/I− generated by the optical receiver unit 107. The high-frequency signal electrode 312 and the bonding electrode 303 are used for the propagation of TE/Q+ generated by the optical receiver unit 110. The high-frequency signal electrode 313 and the bonding electrode 304 are used for the propagation of TE/Q− generated by the optical receiver unit 111.

TM polarization components are individually listed as follows. The high-frequency signal electrode 314 and the bonding electrode 305 are used for the propagation of TM/I+ generated by the optical receiver unit 114.

The high-frequency signal electrode 315 and the bonding electrode 306 are used for the propagation of TM/I− generated by the optical receiver unit 115. The high-frequency signal electrode 316 and the bonding electrode 307 are used for the propagation of TM/Q+ generated by the optical receiver unit 118. The high-frequency signal electrode 317 and the bonding electrode 308 are used for the propagation of TM/Q− generated by the optical receiver unit 119.

In order to maintain high-frequency characteristics, it is preferable to reduce the length of lead wires connected to the bonding electrodes 301 to 308. For this reason, the bonding electrodes 301 to 308 are provided adjacent to an end face 101d on the rear surface of the optical receiver circuit 101. Since the input ends 125 and 148 of incident light and local-oscillator light and a launch end (bonding electrodes 301 to 308) of an electric signal are separated into the end faces 101a and 101d, it is easy to respectively provide an input end of signal light and a launch end of an electric signal on the front surface and the rear surface of a housing having the optical receiver circuit 101 built-in. Therefore, this configuration is appropriate for application to a small-sized pluggable optical transceiver.

The high-frequency signal electrodes 310 to 317 are signal electrodes of a coplanar waveguide of which both sides are interposed in a ground electrode. The signal electrode is designed such that the width is set to 10 µm, the width of a gap between the signal electrode and the ground electrode is set to 6 µm, and the impedance is set to 50Ω. As shown in FIG. 3, the high-frequency signal electrodes 312 to 317 pass over the connection waveguides 141 to 146 and the input waveguide 147 through which local-oscillator light propagates.

Figure 4A:
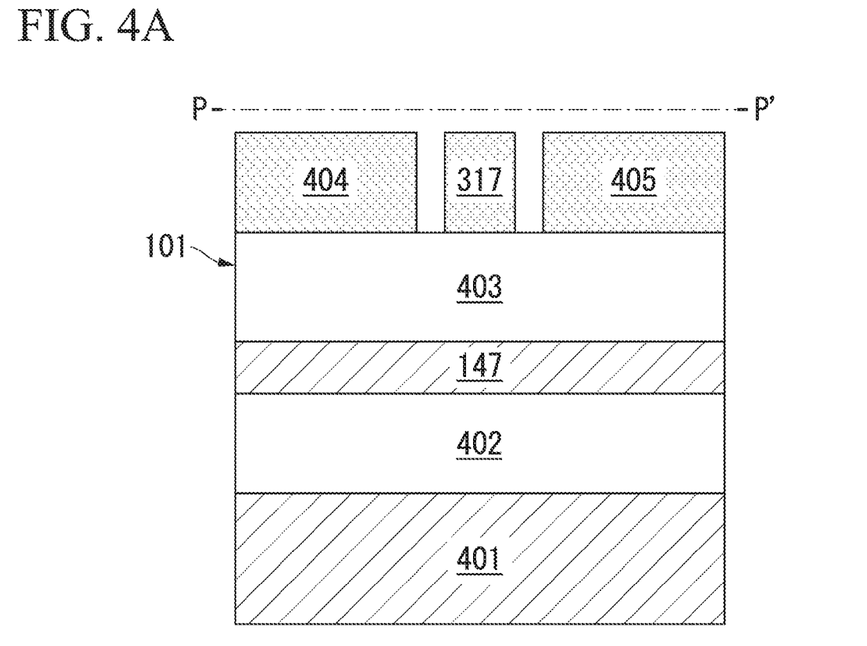
FIG. 4A is a cross-sectional view taken along line P-P' of FIG. 3.

In a vertical plane including a dashed line PP' of FIG. 3, the section of the optical receiver circuit 101 is schematically shown in FIG. 4A. A lower clad 402, a core portion of the input waveguide 147, an upper clad 403, and the high-frequency signal electrode 317 are provided on the substrate 401. Ground electrodes 404 and 405 are provided on the upper clad 403, similar to the high-frequency signal electrode 317.

The substrate 401 is formed of crystalline silicon. It is preferable that the height of the lower clad 402 is set to be equal to or greater than 2 µm in order to prevent the leakage of guided light to the substrate 401. It is preferable that the height of the upper clad 403 is set to be equal to or greater than 1 µm in order to avoid the leakage of guided light to the upper side of the optical receiver circuit 101. In FIG. 4A, it is preferable that the height of the upper clad 403 is equal to or greater than 2 µm in order to avoid light absorption by the high-frequency signal electrode 317 and the ground electrodes 404 and 405. The high-frequency signal electrode 317 and the ground electrodes 404 and 405 are formed of aluminum, and it is preferable that the heights of the high-frequency signal electrode 317 and the ground electrodes 404 and 405 are equal to or greater than 1 µm in order to avoid attenuation in an electric signal.

Figure 4B:
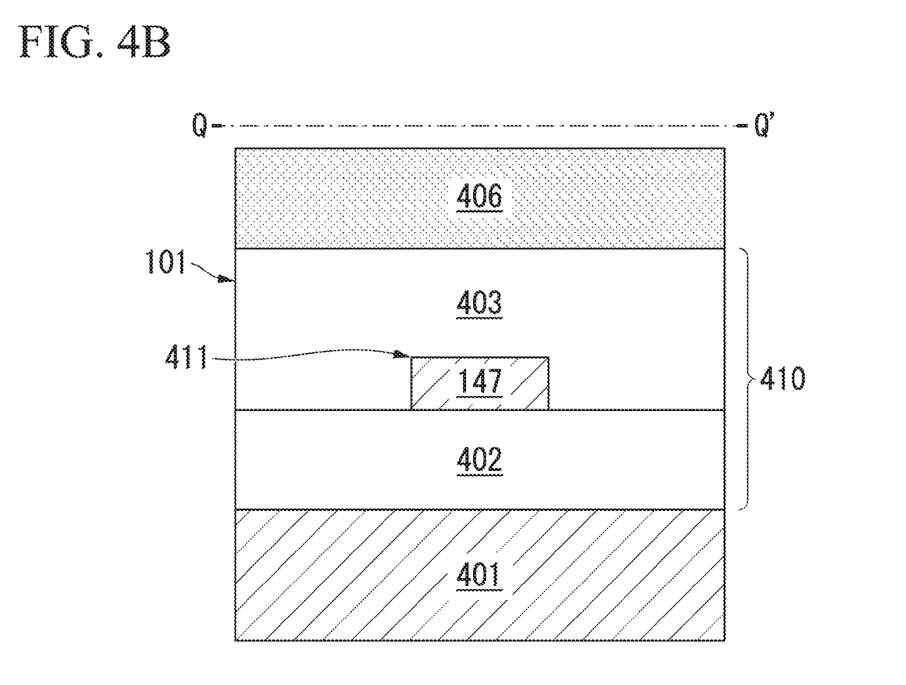
FIG. 4B is a cross-sectional view taken along line Q-Q' of FIG. 3.

The section of the optical receiver circuit 101 in a vertical plane including a dashed line QQ' of FIG. 3 is schematically shown in FIG. 4B. The ground electrode 406 is present on the upper clad 403. In FIG. 3, the ground electrodes 404, 405, and 406 are not shown. Ups and downs such as the unevenness of the upper surface of the upper clad 403 and the swelling of an upper portion of each connection waveguide, may be generated. In this case, there is a possibility that each high-frequency signal electrode is disconnected due to the ups and downs. Therefore, the upper surface of the upper clad 403 may be flattened by grinding, if necessary.

An optical waveguide device 410 formed on the substrate 401 is constituted by a core 411 and a clad (lower clad 402 and upper clad 403). The connection waveguides 127 to 146 and the input waveguides 126 and 147 of FIG. 1 show the arrangement of a core 411 formed on the lower clad 402.

Figure 5:
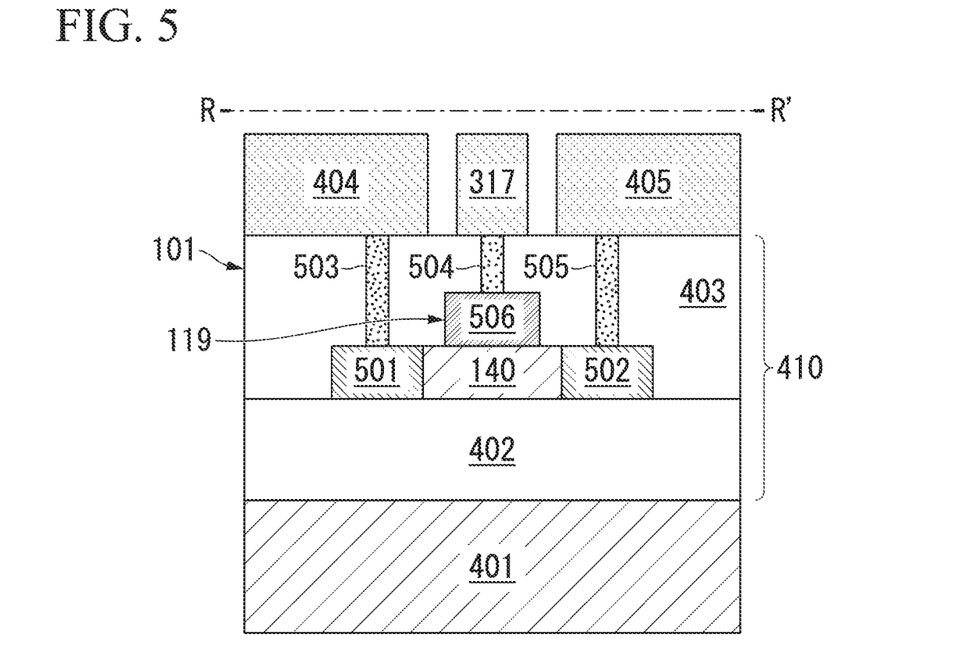
FIG. 5 is a cross-sectional view taken along line R-R' of FIG. 3.

All of the optical receiver units 106 to 119 can have the same configuration. In a vertical plane including a dashed line RR', a schematic cross-sectional view of the optical receiver circuit 101 including the optical receiver unit 119 is shown in FIG. 5. Si contact layers 501 and 502 are provided on both sides of the connection waveguide 140, and a light absorption layer 506 formed of germanium (Ge) is provided on the connection waveguide 140. The Si contact layer 501 is connected to the ground electrode 404 through a via 503. The Si contact layer 502 is connected to the ground electrode 405 through a via 505. The light absorption layer 506 is connected to the high-frequency signal electrode 317 through a via 504. A similar configuration is disclosed in IEEE Journal of Selected Topics in Quantum Electronics vol. 16, no. 1, pp. 307-315, 2010.

It is possible to provide an optical receiver circuit that does not include an intersection waveguide, is made small, has a small light loss, and has excellent high-frequency characteristics, by using the configuration of the waveguide of this example. The optical receiver circuit is suitable for a small-sized digital coherent pluggable optical transceiver.

In a case where an output of local-oscillator light is small, incident light which is signal light may be incident from the input end 148 of the input waveguide 147, and local-oscillator light may be incident from the input end 125 of the input waveguide 126. Also in this case, the effects described in this example are obtained.

Example 2

Figure 6:
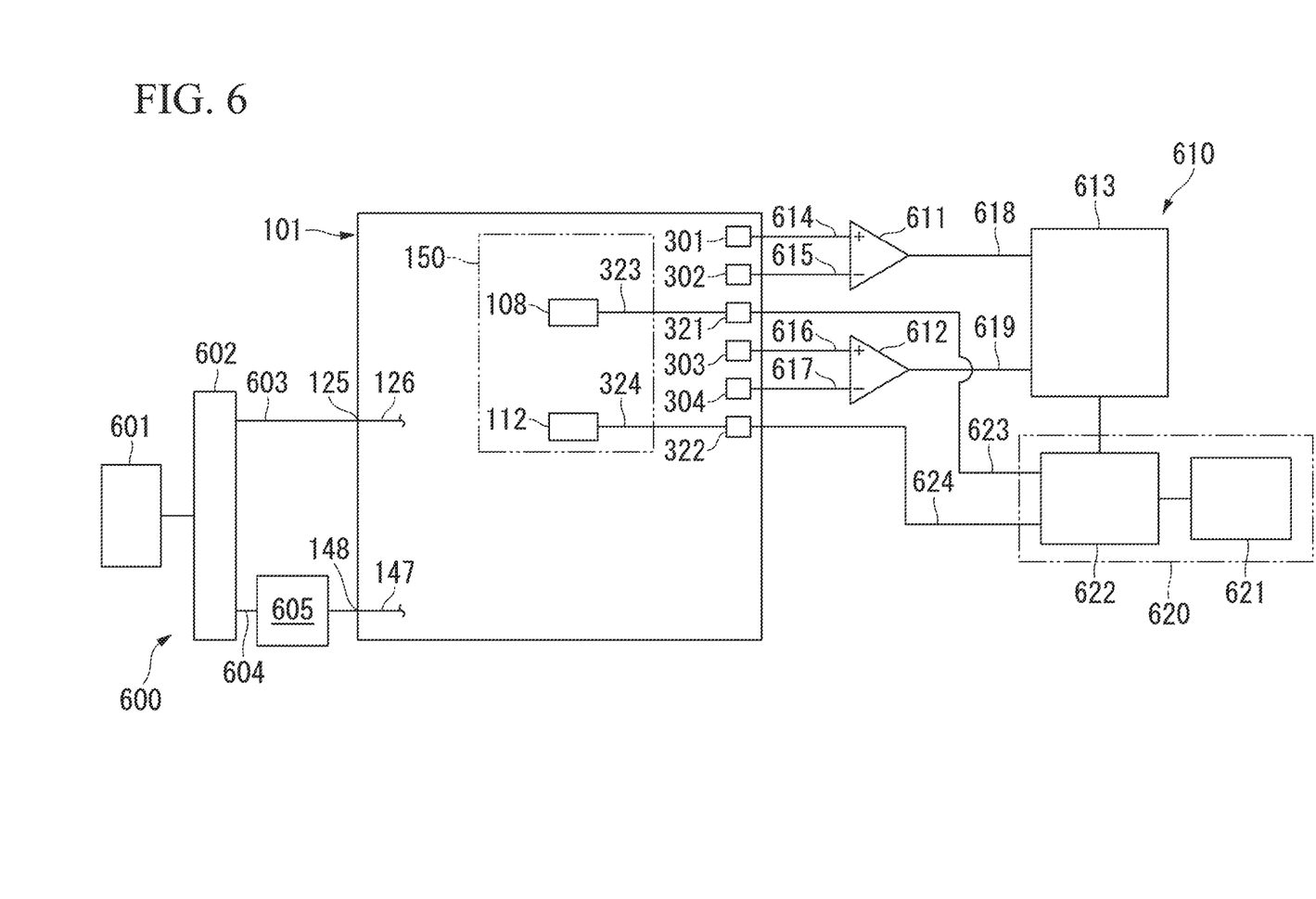
FIG. 6 is a schematic plan view showing a configuration used for a method of adjusting a phase difference.

A description will be given of a method of adjusting a phase difference between an I component and a Q component of each of TE and TM polarization components in the optical receiver circuit described in Example 1. Further, a description will be given of a configuration of an optical receiver circuit in which phase difference adjustment information is stored in a memory. As an example of a configuration of a method of adjusting a phase difference, a schematic diagram of a configuration of a method of adjusting a phase difference with respect to the processing unit 150 is shown in FIG. 6. Although the configuration of the optical receiver circuit 101 which is used herein is the same as those in FIGS. 1 and 3, a portion is omitted in FIG. 6, and only portions referred to in a description of this example will be shown.

Continuous light from a wavelength variable laser 601 which is transmitted in a single mode is branched into two paths 603 and 604 by a beam splitter 602. The continuous light from one path 603 is incident on the optical receiver circuit 101 from the input end 125 of the input waveguide 126, as incident light. The continuous light from the other path 604 is frequency-shifted through a frequency shifter 605, and is incident on the optical receiver circuit 101 from the input end 148 of the input waveguide 147, as local-oscillator light. For example, an acousto-optic frequency shifter or an EO frequency shifter can be used as the frequency shifter 605. The amount of frequency shift is approximately five times larger than a frequency width of a spectral line of the continuous light, and is in a response frequency band of an RF lock-in amplifier 613 which is used in this example. A specific example of the amount of frequency shift is, for example, 10 MHz. As a result of interference between incident light and local-oscillator light, a heterodyne beat having a frequency equal to a frequency shift is generated.

A procedure for adjusting a phase difference between an I component and a Q component in a TE polarization component of incident light to $\pi/2$ will be described. Electric signals TE/I+ and TE/I− of I components which are output from the bonding electrodes 301 and 302 are respectively input to a positive input end and a negative input end of a first differential amplifier 611. The electric signal which is output from the first differential amplifier 611 is input to the RF lock-in amplifier 613 as a reference signal. Electric signals TE/Q+ and TE/Q− of Q components which are output from the bonding electrodes 303 and 304 are respectively input to a positive input end and a negative input end of a second differential amplifier 612, and the electric signal which is output from the second differential amplifier 612 is input to the RF lock-in amplifier 613 as an input signal.

A direct current or a direct voltage which is input to the phase adjustment unit 108 or 112 is adjusted so that the phase of a heterodyne beat detected by the RF lock-in amplifier 613 is set to $\pi/2$. It is possible to similarly perform adjustment on a TM component. A reference signal may be set as an electric signal of a Q component, and an input signal may be set as an electric signal of an I component. In this case, a phase difference between the I component and the Q component is adjusted so as to be set to $-\pi/2$.

An effective refractive index of a waveguide changes due to a change in the wavelength of incident light or a change in temperature, and thus it is necessary to designate a current or a voltage to be applied to each phase adjustment unit in accordance with each wavelength to be used or temperature in order to adjust a current or a voltage to be applied to a phase adjustment units. Consequently, the wavelength of the wavelength variable laser 601 or the ambient temperature of the optical receiver circuit 101 is changed, and a current value or a voltage value which is required to keep a phase difference between an I component and a Q component at $\pi/2$ in each wavelength or temperature are recorded. The recorded current value or voltage value is stored in a memory as a look-up table. A control board (control substrate 620) having a memory 621, storing a look-up table, mounted thereon is connected to the optical receiver circuit 101, and the phase adjustment unit 108 or 112 is controlled in response to a change in wavelength or temperature, thereby allowing a phase difference between I and Q components to be kept at $\pi/2$.

The control substrate 620 includes a control unit 622 that controls a current or a voltage to be applied to the phase adjustment unit 108 or 112. A wiring 623 or 624 is provided between the control unit 622 and the optical receiver circuit 101. The optical receiver circuit 101 includes a bonding electrode 321 or 322 to which a current or a voltage to be applied to the phase adjustment unit 108 or 112 is input, and an electrode 323 or 324 through which the applied current or voltage propagates. The bonding electrode 321 or 322 and the wiring 623 or 624 can be connected to each other by wire bonding. The wiring 623, the bonding electrode 321, and the electrode 323 are provided to connect the control unit 622 and the phase adjustment unit 108 to each other. The wiring 624, the bonding electrode 322, and the electrode 324 are provided to connect the control unit 622 and the phase adjustment unit 112 to each other.

Means (application unit) 600 for applying a frequency shift with respect to continuous incident light to continuous local-oscillator light includes the wavelength variable laser 601, the beam splitter 602, two paths 603 and 604, and the frequency shifter 605. Means (detection unit) 610 for detecting the phase of a heterodyne beat from a reference signal and an input signal includes the differential amplifiers 611 and 612, the RF lock-in amplifier 613, and wirings 614 to 619. The means 600 and 610 can be removed from the optical receiver circuit 101 after a process of adjusting a phase difference is completed.

Individual connections of the wirings 614 to 619 are as follows. The wiring 614 connects the bonding electrode 301 and a positive input end of the first differential amplifier 611 to each other, and the wiring 615 connects the bonding electrode 302 and a negative input end of the first differential amplifier 611 to each other. The wiring 616 connects the bonding electrode 303 and a positive input end of the second differential amplifier 612 to each other, and the wiring 617 connects the bonding electrode 304 and a negative input end of the second differential amplifier 612 to each other. The wiring 618 inputs an electric signal, which is output from the first differential amplifier 611, to the RF lock-in amplifier 613. The wiring 619 inputs an electric signal, which is output from the second differential amplifier 612, to the RF lock-in amplifier 613.

The control substrate 620 including the memory 621 and the control unit 622 is connected to the phase adjustment unit 108 or 112 of the optical receiver circuit 101 when the optical receiver circuit 101 receives signal light. The control unit 622 controls the phase adjustment unit 108 or 112 in response to a change in wavelength or temperature. At this time, a current or a voltage to be applied to the phase adjustment unit is designated with reference to the look-up table stored in the memory 621, and thus it is possible to keep a phase difference between I and Q components at $\pi/2$ in spite of a change in wavelength or temperature. The control substrate 620 may include at least one of means (first input unit) for inputting a signal regarding a change in the wavelength of signal light to the control unit 622 and means (second input unit) for inputting a signal regarding the ambient temperature of the optical receiver circuit 101 to the control unit 622. Since the ambient temperature of the optical receiver circuit 101 is measured in real time, it is possible to provide a temperature sensor on the optical receiver circuit 101 or in the vicinity thereof.

A procedure of adjusting a phase difference between an I component and a Q component in a TM polarization component of incident light to $\pi/2$ is similar to that in a case of a TE polarization component. In this case, electric signals TM/I+ and TM/I− of I components respectively output from the bonding electrodes 305 and 306 are used, instead of electric signals TE/I+ and TE/I− of I components respectively output from the bonding electrodes 301 and 302. In addition, electric signals TM/Q+ and TM/Q− of Q components respectively output from the bonding electrodes 307 and 308 are used, instead of electric signals TE/Q+ and TE/Q− of Q components respectively output from the bonding electrodes 303 and 304.

In a case where the adjustment of a phase difference between I and Q components in a TM polarization component is performed, the memory 621 and the control unit 622 are connected to the phase adjustment units 116 and 120 (see FIG. 1), instead of the phase adjustment units 108 and 112. It is preferable that the memory 621 and the control unit 622 which are used for the control of the phase adjustment units 116 and 120 are provided on the same control substrate 620 as the memory 621 and the control unit 622 which are used for the control of the phase adjustment units 108 and 112.

Meanwhile, the memory 621 and the control unit 622 for a TE polarization component and a TM polarization component may be individually provided. In addition, the same memory 621 and control unit 622 may be used for a TE polarization component and a TM polarization component. Further, the control substrate 620 may also include a control unit used for the control of the phase adjustment unit 124.

As described above, the invention has been described on the basis of preferable embodiments and examples. However, the invention is not limited to the above-described embodiments and examples, and can be modified in various ways without departing from the scope of the invention.

In a method of adjusting a phase difference, a wavelength variable laser is used as a light source in Example 2, but this adjustment method is not limited thereto. In a case of not coping with a change in wavelength, a single wavelength laser may be used. Even in a case of coping with a change in wavelength, it is possible to use a combination of two or more light sources having different wavelengths. In this case, a light source connected to an input end of an optical receiver circuit may be changed over whenever a phase difference is adjusted to a different wavelength.

Light emitted from the same light source is branched into two paths in Example 2, but this adjustment method is not limited thereto. It is also possible to individually provide a light source generating continuous incident light and a light source generating continuous local-oscillator light. In this case, it is possible to omit a beam splitter. In addition, when wavelengths of continuous lights which are output from two light sources are different from each other, it is possible to omit a frequency shifter. However, as in Example 2, it is possible to easily perform the adjustment of a phase difference in different wavelengths by using one wavelength variable laser as a light source.

In Example 2, a frequency shifter is provided in a path through which local-oscillator light propagates, but a frequency shifter may be provided in a path through which incident light propagates. In addition, a frequency shifter may be provided in each of the paths. Means (detection unit) for detecting the phase of a heterodyne beat is not limited to an RF lock-in amplifier, and a known phase detector, such as a normal lock-in amplifier, which operates with, for example, approximately 100 KHz or less (frequency lower than RF) may also be used. It is preferable that an electric signal used for the modulation of a light signal, or the like is a high-frequency signal for an increase in the speed of a signal, but the invention is not limited to the use for high-frequency (RF).

What is claimed is:

1. An optical receiver circuit comprising:
   a substrate; and
   an optical waveguide device that is formed on the substrate, wherein
   the optical waveguide device comprises:
     a first optical splitter section in which signal light propagates, the first optical splitter section branching the signal light into a first signal light propagation waveguide and a second signal light propagation waveguide and;
     a second optical splitter section in which local-oscillator light propagates, the second optical splitter section branching the local-oscillator light into a first local-oscillator light propagation waveguide and a second local-oscillator light propagation waveguide;
     a first optical coupler section that combines the signal light propagating through the first signal light propagation waveguide and the local-oscillator light propagating through the first local-oscillator light propagation waveguide with each other, and makes the signal light and the local-oscillator light interfere with each other;

a second optical coupler section that combines the signal light propagating through the second signal light propagation waveguide and the local-oscillator light propagating through the second local-oscillator light propagation waveguide with each other, and makes the signal light and the local-oscillator light interfere with each other;

at least one first optical receiver unit that receives output light from the first optical coupler section;

at least one second optical receiver unit that receives output light from the second optical coupler section; and a phase adjustment unit that is arranged in at least one of the first local-oscillator light propagation waveguide and the second local-oscillator light propagation waveguide, wherein the first optical splitter section and the second optical splitter section are disposed so that a propagation direction of the local-oscillator light in the second optical splitter section is set to be a direction opposite to a propagation direction of the signal light in the first optical splitter section, wherein the first optical coupler section and the second optical coupler section are disposed so that a propagation direction of the output light in the second optical coupler section is set to be a direction same as a propagation direction of the output light in the first optical coupler section, and wherein all waveguides for propagating at least one of the signal light and the local-oscillator light in the optical waveguide device are arranged so as not to overlap with each other with respect to the substrate when seen in a plan view, the first local-oscillator light propagation waveguide passes through a lateral side of the first optical coupler section and is then connected to the first optical coupler section through a first 180-degree bent portion, the first 180-degree bent portion is directly connected to the first optical coupler section, the second local-oscillator light propagation waveguide passes through a lateral side of the second optical coupler section and is then connected to the second optical coupler section through a second 180-degree bent portion, and the second 180-degree bent portion is directly connected to the second optical coupler section.

2. The optical receiver circuit according to claim 1, wherein the second optical splitter section is arranged on a side opposite to the first optical coupler section and the second optical coupler section with respect to the first optical receiver unit and the second optical receiver unit.

3. The optical receiver circuit according to claim 1, further comprising:

an electrode that is provided on the optical waveguide device and propagates an electric signal which is output from each of the first optical receiver unit and the second optical receiver unit.

4. The optical receiver circuit according to claim 3, wherein a part of the waveguide included in the optical waveguide device and the first and second optical splitter sections passes below the electrode.

5. The optical receiver circuit according to claim 1, wherein the optical waveguide device includes a polarization splitting circuit at a front stage of the first optical splitter section.

6. The optical receiver circuit according to claim 5, wherein the polarization splitting circuit comprises a polarization splitting unit that is configured to split basic-order TE polarization and TM polarization from incident polarization multiplexed light, and a polarization rotation unit that is configured to rotate the TM polarization to the TE polarization.

7. The optical receiver circuit according to claim 5, wherein the polarization splitting circuit comprises a polarization rotation unit that is configured to convert basic-order TM polarization into high-order TE polarization in incident polarization multiplexed light, and a polarization splitting unit that is configured to split basic-order TE polarization and high-order TE polarization from each other.

8. The optical receiver circuit according to claim 5, wherein the optical waveguide device comprises two sets of processing units each of which is constituted by the first optical splitter section, the second optical splitter section, the first optical coupler section, the second optical coupler section, the first optical receiver unit, the second optical receiver unit, and the phase adjustment unit;

a first connection waveguide, connected to the first optical splitter section, which is configured to propagate two polarizations split by the polarization splitting circuit to the different processing units, a second connection waveguide, connected to the second optical splitter section, which is configured to propagate the local-oscillator light to the different processing units, a signal light input waveguide that is configured to propagate the signal light from a location where the signal light is incident on the optical waveguide device to the polarization splitting circuit, a local-oscillator light input waveguide that is configured to propagate the local-oscillator light from a location where the local-oscillator light is incident on the optical waveguide device, and an optical splitter section that branches the local-oscillator light propagating through the local-oscillator light input waveguide into two second connection waveguides.

9. The optical receiver circuit according to claim 1, wherein the optical waveguide device comprises a core formed of silicon and a clad formed of silica.

10. The optical receiver circuit according to claim 1, wherein a waveguide for propagating the local-oscillator light includes a 90-degree bent portion at one or two locations between a first location where the local-oscillator light is incident on the optical waveguide device and a second location where the waveguide connected to a first arranged optical splitter section.

11. The optical receiver circuit according to claim 1, further comprising:

an application unit that is configured to apply a frequency shift with respect to continuous incident light to the continuous local-oscillator light; and a detection unit that is configured to generate a heterodyne beat by making the incident light and the local-oscillator light, having the frequency shift applied thereto, interfere with each other, to thereby detect a phase of the heterodyne beat by setting either an output electric signal which is output from the first optical receiver unit or an output electric signal which is output from the second optical receiver unit as a reference signal and setting the other output electric signal different from the reference signal as an input signal, wherein the optical receiver circuit is configured to adjust a phase difference between the local-oscillator light incident on the first optical coupler section and the local-oscillator light incident on the second optical coupler section to $\pi/2$ by keeping the phase at $\pi/2$.

12. The optical receiver circuit according to claim 1, wherein the optical receiver circuit is connected to a control substrate, having a memory for recording a setting value of a current or a voltage to be applied to the phase adjustment unit at the time of adjusting a phase difference between the local-oscillator light incident on the first optical coupler section and the local-oscillator light incident on the second optical coupler section to $\pi/2$, mounted thereon.

13. A method of adjusting the optical receiver circuit according to claim 1, the method comprising:

applying a frequency shift with respect to continuous incident light to the continuous local-oscillator light;

generating a heterodyne beat by making the incident light and the local-oscillator light, having the frequency shift applied thereto, interfere with each other;

detecting a phase of the heterodyne beat by setting either an output electric signal which is output from the first optical receiver unit or an output electric signal which is output from the second optical receiver unit as a reference signal and setting the other output electric signal different from the reference signal as an input signal; and adjusting a phase difference between the local-oscillator light incident on the first optical coupler section and the local-oscillator light incident on the second optical coupler section to $\pi/2$ by keeping the phase at $\pi/2$.

14. The method according to claim 13, further comprising:

recording a setting value of a current or a voltage to be applied to the phase adjustment unit at the time of adjusting a phase difference between the local-oscillator light incident on the first optical coupler section and the local-oscillator light incident on the second optical coupler section to $\pi/2$, in a memory.

* * * * *